(12) United States Patent
Wilks

(10) Patent No.: US 7,992,760 B2
(45) Date of Patent: Aug. 9, 2011

(54) CONDUIT PURGING DEVICE AND METHOD

(75) Inventor: Michael T. Wilks, Gambrills, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 1341 days.

(21) Appl. No.: 11/357,458

(22) Filed: Feb. 8, 2006

(65) Prior Publication Data

US 2007/0084902 A1 Apr. 19, 2007

Related U.S. Application Data

(60) Provisional application No. 60/652,279, filed on Feb. 9, 2005.

(51) Int. Cl.
*B23K 20/14* (2006.01)
*B23K 9/16* (2006.01)

(52) U.S. Cl. ............. 228/42; 228/219; 219/61; 219/72; 219/74

(58) Field of Classification Search .............. 228/42, 228/219; 219/61, 72, 74
See application file for complete search history.

(56) References Cited

U.S. PATENT DOCUMENTS

| | | | |
|---|---|---|---|
| 4,423,890 A | 1/1984 | Hackett et al. | |
| 5,425,492 A | 6/1995 | Thode | |
| 5,811,055 A | 9/1998 | Geiger | |
| 5,864,111 A * | 1/1999 | Barefoot | 219/61 |
| 6,653,596 B2 | 11/2003 | Blankenship | |
| 6,739,204 B1 * | 5/2004 | Barefoot | 73/861.32 |
| 2002/0195429 A1 | 12/2002 | Fusaro, Jr. et al. | |

* cited by examiner

*Primary Examiner* — Jessica L Ward
*Assistant Examiner* — Devang R Patel
(74) *Attorney, Agent, or Firm* — Matthew F. Johnston

(57) ABSTRACT

A device for purging gas comprises a conduit assembly defining an interior volume. The conduit assembly comprises a first conduit portion having an open first end and an open second end and a second conduit portion having an open first end and a closed second end. The open second end of the first conduit portion is disposed proximate to the open first end of the second conduit portion to define a weld region. The device further comprises a supply element supplying a gas to the interior volume at a substantially constant rate and a vent element venting the gas from the interior volume at a rate that maintains the gas in the interior volume within a pressure range suitable to hold a weld bead in the weld region in equilibrium during formation of a weld to join the first conduit portion and the second conduit portion.

35 Claims, 3 Drawing Sheets

CONDUIT PURGING DEVICE AND METHOD

CROSS REFERENCE TO RELATED APPLICATIONS

The benefit of priority is claimed under 35 U.S.C. 119(e) of U.S. Provisional Patent Application No. 60/652,279 filed Feb. 9, 2005, entitled "Dead End Welding Device and Method," which is incorporated by reference herein in its entirety.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

The present invention relates to a device for purging gas and, more particularly, to a device for purging gas from a conduit.

2. Description of the Related Art

When welding conduit sections of certain materials, such as stainless steel and/or other alloys, for example, it is desirable to remove reactive gases from the weld region. Gases, such as oxygen, tend to chemically react with the molten conduit material and degrade the quality of the resultant weld. Conduit purging systems are used to fill the conduit with an inert gas, such as argon, for example, to displace the reactive gases from the weld region.

Manufacturers of welding systems typically provide specifications identifying recommended purge gas flow rates and pressures to obtain high quality welds for conduits of various sizes and materials. The recommended flow rates and pressures, however, are designated for open-ended conduit sections in which these parameters can be maintained. For open-ended conduits, the purge gas flows through the conduit sections and is either vented or recaptured. A problem arises when welding an open-ended conduit to a conduit having a closed end, such as a cap or a pressure vessel. In such a closed-ended system the purge gas has an inlet, but no outlet. Accordingly, when the gas is supplied to the conduit, the gas pressure within the conduit continually increases until the weld bead blows out of the weld region.

One proposed solution to the problem of welding closed-ended conduits is to turn off the gas purge partway through the welding process, in particular, before the pressure causes weld failure. This solution, however, is difficult to implement, generates uncontrolled purge gas pressure within the conduit, and provides inconsistent results and many failed welds.

SUMMARY OF EXEMPLARY ASPECTS

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

To overcome the drawbacks of the prior art and in accordance with the purpose of the invention, as embodied and broadly described herein, one aspect of the invention relates to a device for purging gas, comprising a conduit assembly defining an interior volume. The conduit assembly may comprise a first conduit portion having an open first end and an open second end and a second conduit portion having an open first end and a closed second end, wherein the open second end of the first conduit portion is disposed proximate to the open first end of the second conduit portion to define a weld region. The device may further comprise a supply element supplying a gas to the interior volume at a substantially constant rate and a vent element venting the gas from the interior volume at a rate that maintains the gas in the interior volume within a pressure range suitable to hold a weld bead in the weld region in equilibrium during formation of a weld to join the first conduit portion and the second conduit portion.

As used herein, "conduit" means tube, pipe, duct, and/or other channel, and is not limited to structures having a round cross-section. A "conduit portion" may range from a single, relatively short section of conduit up to an extended conduit system. As used herein, "closed end" includes a portion of conduit having an end that is sealed and/or closed with a cover, such as a cap, for example. "Closed end" also includes arrangements where a conduit portion attaches to a closed vessel, such as a storage tank or dewar, for example, as well as arrangements where the conduit portion attaches to a conduit system that is closed.

Further, as used herein, "weld" is used in a broad sense to refer to a range of processes for joining metallic and/or non-metallic materials, including, for example, many types of welding, soldering, and brazing processes. These processes encompass those in which a filler material is added to the weld area while the materials are molten, as well as processes where no filler material is used (i.e., autogenous processes). As used herein, "weld bead" means the molten material in the weld area, which may or may not include a filler material.

Still further, as used herein, "equilibrium" means a stable, load-balanced condition that allows the proper formation of a weld. If the gas pressure in the interior volume is too low, the weld bead will collapse into the conduit. If the gas pressure is too high, the weld bead will blow out of the weld region. When a weld bead is in equilibrium, the pressure in the interior volume supports the weight of the weld bead against external pressure without blowing the bead out.

In another aspect, the invention relates to a device for purging gas from a conduit assembly defining a weld region at proximate ends of a first conduit portion and a second conduit portion, the second conduit portion having one closed end. The device may comprise a supply element configured to supply a gas to an interior volume of the conduit assembly at a substantially constant rate and a vent element configured to vent the gas from the interior volume at a rate that maintains the gas in the interior volume within a pressure range suitable to hold a weld bead in the weld region in equilibrium during formation of a weld to join the first conduit portion and the second conduit portion.

In a further aspect, the invention relates to a method of purging gas, comprising providing a conduit assembly defining an interior volume. The conduit assembly may comprise a first conduit portion having an open first end and an open second end and a second conduit portion having an open first end and a closed second end. The method may further comprise disposing the open second end of the first conduit portion proximate to the open first end of the second conduit portion to define a weld region, supplying a gas to the interior volume at a substantially constant rate, and venting the gas from the interior volume at a rate that maintains the gas in the interior volume within a pressure range suitable to hold a weld bead in the weld region in equilibrium during formation of a weld to join the first conduit portion and the second conduit portion.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings.

DETAILED DESCRIPTION OF EXEMPLARY EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
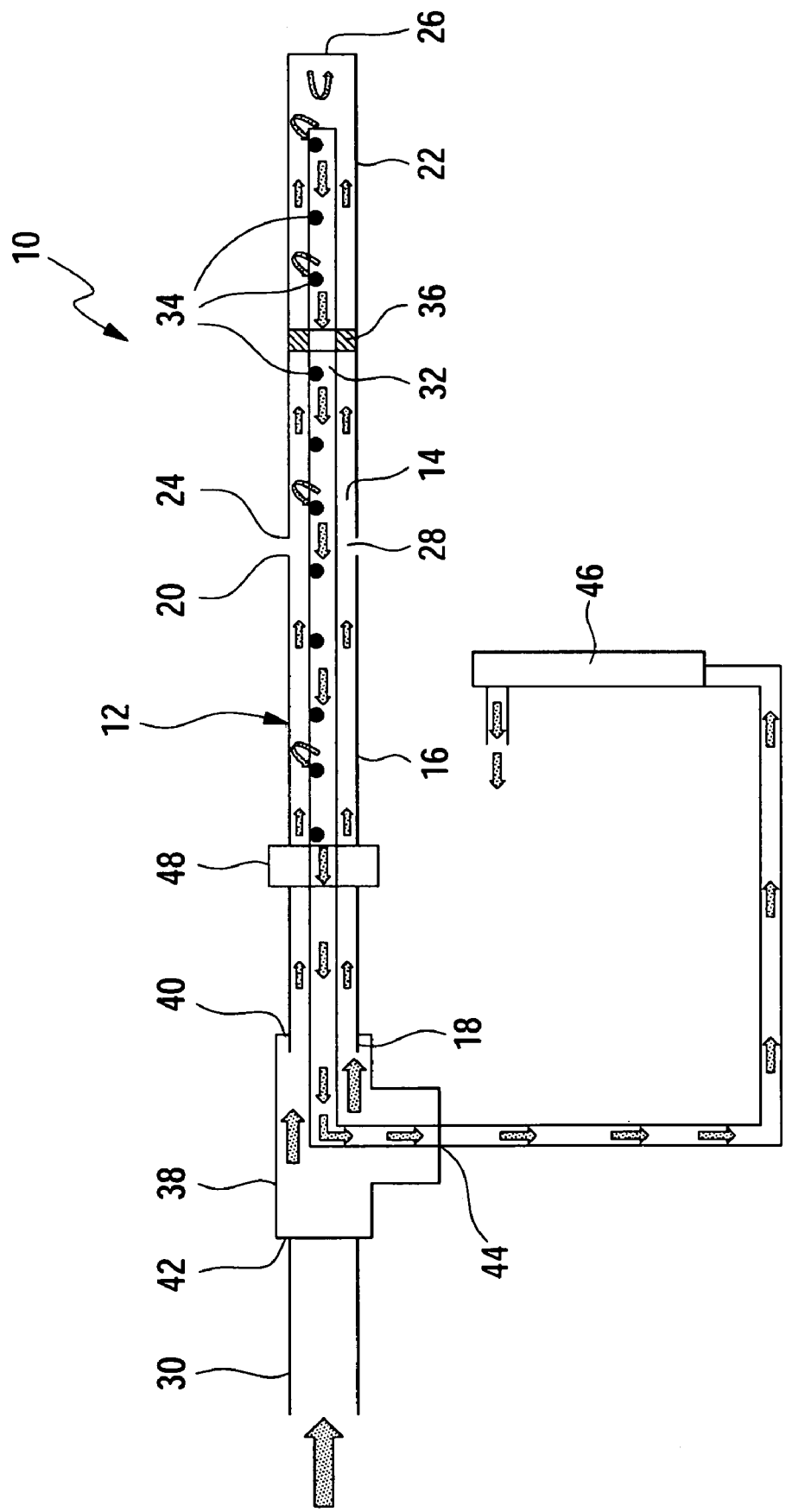
FIG. 1 is a cross-sectional view of an embodiment of a conduit purging device according to the present invention.

An embodiment of a conduit purging device 10 is shown in FIG. 1. The device comprises a conduit assembly 12 defining an interior volume 14. The conduit assembly 12 comprises a first conduit portion 16 having an open first end 18 and an open second end 20, and a second conduit portion 22 having an open first end 24 and a closed second end 26. As discussed above, the closed second end 26 may be sealed in a closed configuration and/or closed with a cover, such as a cap, for example. The closed second end 26 may alternatively be attached to a closed vessel, such as a storage tank or dewar, for example. In yet another example, the closed second end 26 may be attached to a larger conduit system that is closed.

The conduit assembly 12 in FIG. 1 is arranged for welding the first conduit portion 16 to the second conduit portion 22, as with a butt weld, for example. The open second end 20 of the first conduit portion 16 is disposed proximate to the open first end 24 of the second conduit portion 22 to define a weld region 28.

The conduit purging device 10 shown in FIG. 1 further comprises a supply element 30 supplying a gas to the interior volume 14 at a substantially constant rate. Further, a vent element 32 is provided for venting the gas from the interior volume 14. The vent element 32 vents the gas at a rate that maintains the gas in the interior volume 14 within a pressure range suitable to hold a weld bead in the weld region 28 in equilibrium during formation of the weld to join the first conduit portion 16 and the second conduit portion 22.

The gas pressure range may be based on at least one of a conduit property and a welding property. These properties may affect the performance of the system and the interaction of the purge gas through chemical interactions and flow-related losses.

The conduit property may be chosen from conduit material, conduit length, conduit cross-sectional area, and conduit thickness. The device of the present invention may be used with metallic, as well as non-metallic conduits, such as plastics and/or composites, for example. Other non-metallic materials may also be used. The metallic conduits may comprise at least one of aluminum, cobalt, copper, magnesium, nickel, carbon steel, stainless steel, and titanium. Other metals and alloys may also be used.

The welding property may be chosen from the welding method and the welding device. The welding method and/or the welding device may govern the desired gas pressure in the interior volume.

A variety of types of inert gases and gases having specific purity levels may be supplied to the interior volume by the supply element. Generally, particular gases may be used based on the temperature range at which a weld is carried out. Further, gases having a higher purity are associated with higher quality welds. In one embodiment, the gas supplied by the supply element may comprise at least one of argon, helium, nitrogen, and carbon dioxide. Other gases may also be used.

In the embodiment of FIG. 1, the supply element 30 supplies gas to the first end 18 of the first conduit portion 16. The supply element 30 may comprise a tube made of TEFLON®, stainless steel, or other impervious material. The supply element 30 may place the interior volume 14 in fluid communication with a pressurized gas source, such as a pressurized tank, for example. Other arrangements may also be used.

Also, as shown in FIG. 1, the vent element 32 places the interior volume 14 in fluid communication with a location external to the conduit assembly 12. In one embodiment, the vent element 32 is disposed in the interior volume 14. In another embodiment, the vent element 32 is disposed in at least one of the first conduit portion 16 and the second conduit portion 22. Optionally, the vent element 32 may be disposed in the first conduit portion 16 and the second conduit portion 22.

The vent element 32 may comprise a single extended element, or may comprise multiple elements connected in series. For example, the vent element 32 may comprise a single element that extends from the interior volume 14 to a location external to the conduit assembly 12. Alternatively, the vent element 32 may comprise a first rigid portion within the interior volume 14 and a second flexible portion that extends from the interior volume 14 to a location external to the conduit assembly 12. Other arrangements may also be used. As with the supply element 30, the vent element 32 may comprise one or more tubes made of TEFLON®, stainless steel, or other impervious material.

The vent element 32 may have a cross-sectional shape substantially identical to that of the conduit assembly 12. The cross-sectional shape may include round, oval, elliptical, square, rectangular, and/or other shapes. In the embodiment shown in FIG. 1, the vent element 32 has an extended axial configuration. In some embodiments, the vent element 32 may have a substantially tubular shape.

Figure 2:
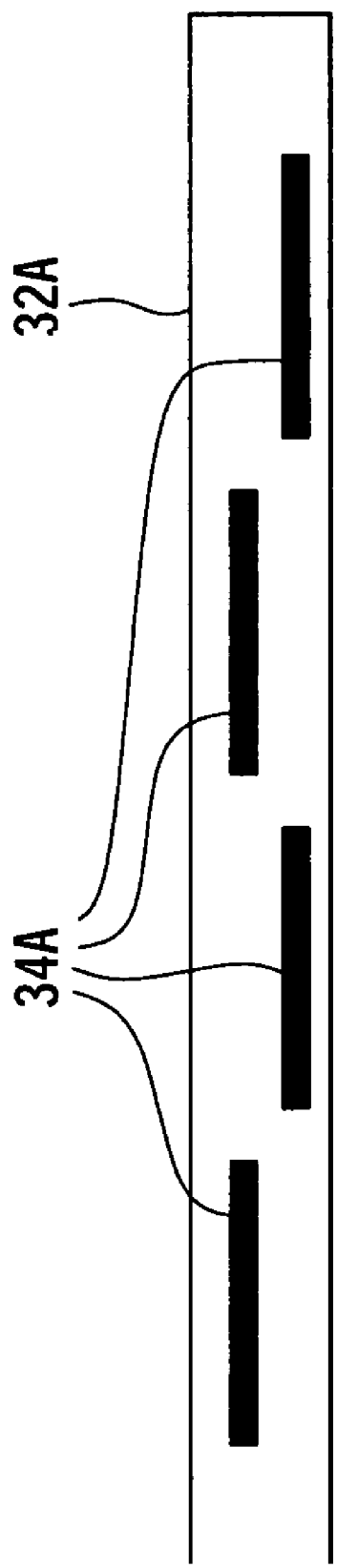
FIG. 2 is an alternative embodiment of a component of the device of FIG. 1.

The vent element 32 may define at least one opening 34 to allow the gas to pass out of the interior volume 14. The at least one opening 34 may comprise at least one of holes and slots. In the embodiment of FIG. 1, the vent element 32 defines a plurality of substantially circular openings 34. In another embodiment, shown in FIG. 2, the vent element 32A defines a plurality of slots 34A. The size, number, and distribution of the openings may be selected to provide the desired gas pressure in the interior volume 14 of the conduit assembly 12.

The conduit purging device 10 of the present invention may further comprise at least one spacer element 36 positioning the vent element 32 with respect to the conduit assembly 12, as shown in FIG. 1. The spacer element 36 may be used to center the vent element 32 within the conduit assembly 12 to optimize gas flow within the system. In one embodiment, TEFLON® tape was used as a spacer element 36. Other materials may also be used. In the embodiment of FIG. 1, the spacer element 36 is disposed on an external surface of the vent element 32. Other arrangements may also be used.

In the embodiment shown in FIG. 1, the conduit purging device 10 further comprises a multiple-port fitting 38 removably secured to the conduit assembly 12 to associate the supply element 30 and the vent element 32 with the interior volume. The multiple-port fitting 38 shown comprises a T-fitting. Other arrangements, including a Y-fitting, may also be used. The multiple-port fitting 38 may be removably secured to the first end 18 of the first conduit portion 16 through a first port 40. As shown in FIG. 1, the supply element 30 passes through a second port 42 on the multiple-port fitting 38. In addition, the vent element 32 passes from the internal volume 14 through a third port 44 on the multiple-port fitting 38.

Figure 3:
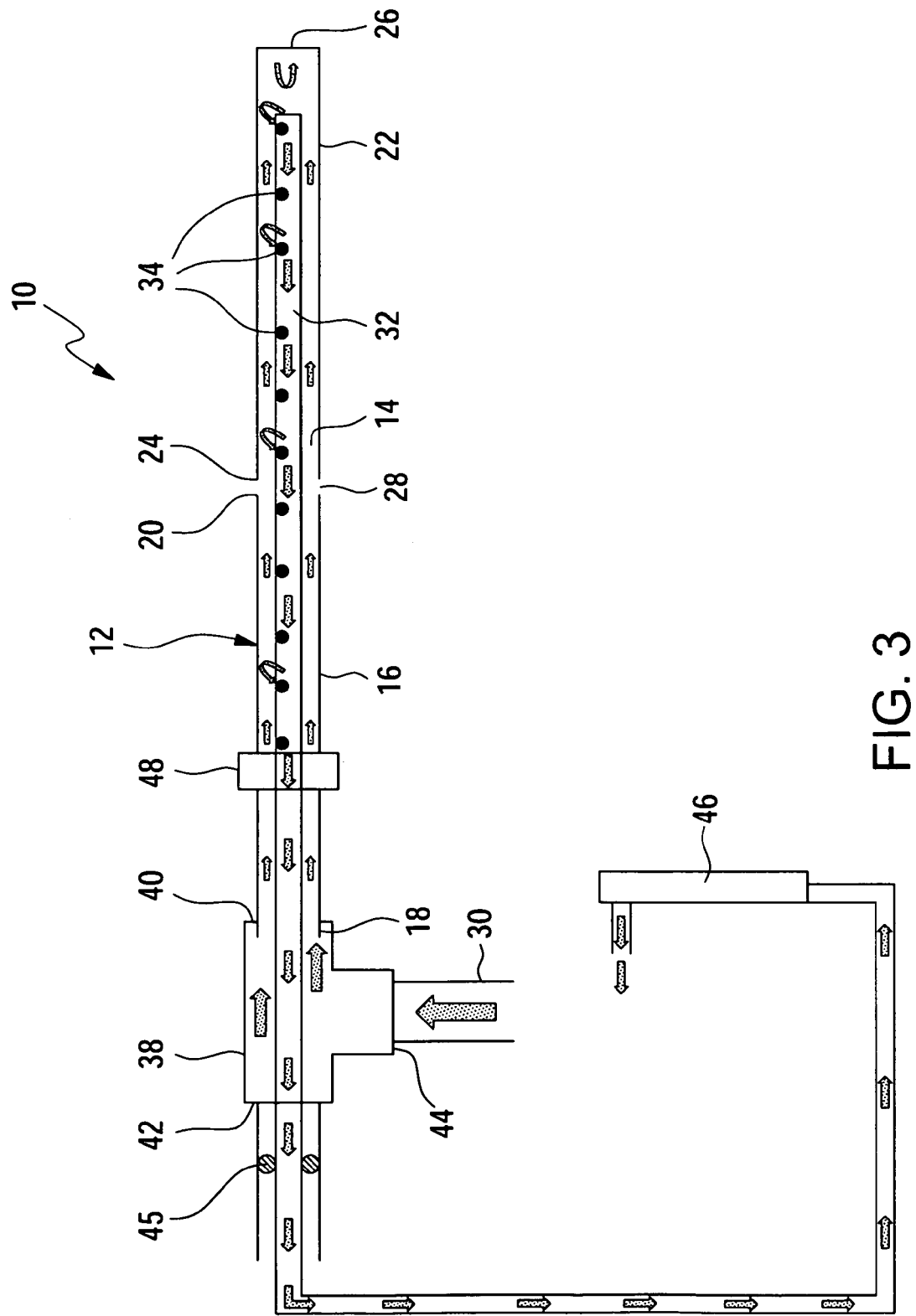
FIG. 3 is a cross-sectional view of another embodiment of a conduit purging device according to the present invention.

In another embodiment of the conduit purging device 10, shown in FIG. 3, the supply element 30 passes through the third port 44 and the vent element 32 passes through the second port 42 on the multiple-port fitting. An O-ring 45 or other seal may be provided to properly seal the gas within the device. Other configurations may also be used.

In a still further embodiment, the conduit purging device 10 may comprise a sensor 46 to measure at least one of gas flow rate and gas pressure. The measurement of flow rate and/or pressure may be made at a variety of locations on the device, including in the supply element 30, in the interior volume 14, in the weld area 28, and/or in the vent element 32. A sensor 46 arranged to measure the gas flow rate in the vent element 32 is shown in FIG. 1.

The operation of one embodiment of the device 10 to join the first and second conduit portions 16, 22 using a butt weld will now be described with reference to FIG. 1. The open second end 20 of the first conduit portion 16 is disposed proximate to the open first end 24 of the second conduit portion 22. The first conduit portion 16 is disposed in a mounting fixture 48.

An inert gas is supplied at a substantially constant rate to the interior volume 14 of the conduit assembly 12 using the supply element 30. The arrows in FIG. 1 depict the flow of the gas through the device. The supply element 30 engages the multiple-port fitting 38, which is removably secured to the first conduit portion 16. The inert gas enters the interior volume 14 and displaces substantially all of the reactive gases in the weld region 28 that would degrade the weld. As the gas pressure in the interior volume 14 increases, gas flows into the vent element 32 through the openings 34 and is vented to a location external to the conduit assembly 12. The gas is vented at a rate that maintains the gas in the interior volume 14 within a pressure range suitable to hold a weld bead in the weld region 28 in equilibrium during formation of the weld.

In one example, two conduit portions 16, 22 comprising stainless steel tubing having an inner diameter of approximately 0.25 inches and a wall thickness of approximately 0.035 inches were joined with a butt weld using an embodiment of the conduit purging device 10. Ultrahigh purity argon gas having approximately 99.999% purity was provided from a pressurized tank to a supply element 30, comprising a TEFLON® tube having a diameter of approximately 0.125 inches.

A vent element 32 was disposed in the interior volume 14. The vent element 32 comprised a stainless steel tube having an inner diameter of approximately 0.125 inches connected to a similarly sized TEFLON® tube. The stainless steel portion of the vent element 32 contained a series of circular holes 34 having a diameter of approximately 0.0625 inches. The holes 34 were spaced in approximately one inch intervals along its length. The stainless steel portion of the vent element 32 was disposed in the interior volume 14 so that it was partially disposed in the first conduit portion 16 and partially disposed in the second conduit portion 22.

The argon was provided to the conduit purging device 10 at a flow rate in the vent element 32 of approximately 0.4 to 0.6 standard cubic feet per hour (scfh) and at a pressure in the interior volume 14 of approximately 2.5 to 3.5 inches of water column (iwc).

A gas tungsten arc weld (GTAW) was then carried out using an orbital welding device made by SWAGELOK®. The conduit purging device 10 allowed the production of a substantially flawless weld, as defined by the American Welding Society Standard D17.1:2001, "Specification for Fusion Welding for Aerospace Applications."

The present invention is described in association with a variety of welding processes. It should be understood that the conduit purging system of the present invention may also be used in other applications.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. A device for purging gas, comprising:
   a conduit assembly defining an interior volume, the conduit assembly comprising:
      a first conduit portion having an open first end and an open second end; and
      a second conduit portion having an open first end and a closed second end,
   wherein the open second end of the first conduit portion is disposed proximate to the open first end of the second conduit portion to define a weld region;
      a supply element supplying a gas to the interior volume at a substantially constant rate; and
      a vent element venting the gas from the interior volume at a rate that maintains the gas in the interior volume within a pressure range suitable to hold a weld bead in the weld region in equilibrium during formation of a weld to join the first conduit portion and the second conduit portion; wherein said vent element is configured such that an interior volume of said first and second conduit portions are substantially free of obstructions to thereby maintain fluid flow of said gas within said interior volume of said second conduit portion through to said open first end of said first conduit portion and wherein said vent element does not contact said first and second conduit portions such that an interior surface of said first and second conduit portions remains free of obstruction to substantially permit free gas flow between said closed end of said second conduit portion and said open end of said first conduit portion.

2. The device of claim 1, wherein the pressure range is based on at least one of a conduit property and a welding property.

3. The device of claim 2, wherein the conduit property is chosen from conduit material, conduit length, conduit cross-sectional area, and conduit thickness.

4. The device of claim 3, wherein the conduit material comprises at least one of aluminum, cobalt, copper, magnesium, nickel, carbon steel, stainless steel, and titanium.

5. The device of claim 3, wherein the conduit material comprises a non-metallic substance.

6. The device of claim 2, wherein the welding property is chosen from welding method and welding device.

7. The device of claim 1, wherein the gas comprises at least one of argon, helium, nitrogen, and carbon dioxide.

8. The device of claim 1, wherein the supply element supplies gas to the first end of the first conduit portion.

9. The device of claim 1, wherein the supply element places the interior volume in fluid communication with a pressurized gas source.

10. The device of claim 1, wherein the vent element places the interior volume in fluid communication with a location external to the conduit assembly.

11. The device of claim 1, wherein the vent element is disposed in the interior volume and is sufficiently spaced apart from an interior surface of said conduit assembly to thereby maintain a valveless flow path of said gas between said interior volume of said conduit assemble to a volume external said conduit assembly.

12. The device of claim 11, wherein the vent element is disposed in at least one of the first conduit portion and the second conduit portion.

13. The device of claim 12, wherein the vent element is disposed in the first conduit portion and the second conduit portion.

14. The device of claim 1, wherein the vent element has a cross-sectional shape substantially identical to that of the conduit assembly.

15. The device of claim 1, wherein the vent element has an extended axial configuration.

16. The device of claim 15, wherein the vent element has a substantially tubular shape.

17. The device of claim 1, wherein the vent element comprises at least one opening.

18. The device of claim 17, wherein the at least one opening comprises at least one of holes and slots.

19. The device of claim 17, wherein the vent element comprises a plurality of openings.

20. The device of claim 1, further comprising a multiple-port fitting removably secured to the conduit assembly to associate the supply element and the vent element with the interior volume.

21. The device of claim 1, further comprising a sensor to measure at least one of gas flow rate and gas pressure.

22. A device for purging gas from a conduit assembly defining a weld region at proximate ends of a first conduit portion and a second conduit portion, the second conduit portion having one closed end, the device comprising:
 a supply element configured to supply a gas to an interior volume of the conduit assembly at a substantially constant rate;
 a vent element configured to vent the gas from the interior volume at a rate that maintains the gas in the interior volume within a pressure range suitable to hold a weld bead in the weld region in equilibrium during formation of a weld to join the first conduit portion and the second conduit portion, and
 a multi-port fitting having a first port secured to an open end of said first conduit portion of said conduit assembly, a second port connected to said supply element external said conduit assembly, and a third port connected to said vent element for porting said gas to an external environment;
  wherein said vent element does not contact said first and second conduit portions such that an interior surface of said first and second conduit portions remains free of obstruction to substantially permit free gas flow between said closed end of said second conduit portion and said open end of said first conduit portion.

23. The device of claim 22, wherein the vent element has an extended axial configuration.

24. The device of claim 23, wherein the vent element has a substantially tubular shape.

25. The device of claim 22, wherein the vent element defines at least one opening.

26. The device of claim 25, wherein the at least one opening comprises at least one of holes and slots.

27. The device of claim 25, wherein the vent element defines a plurality of openings.

28. The device of claim 22, further comprising a multiple-port fitting configured to removably secure to the conduit assembly to associate the supply element and the vent element with the interior volume.

29. A method of purging gas, comprising: providing a conduit assembly defining an interior volume, the conduit assembly comprising: a first conduit portion having an open first end and an open second end; and a second conduit portion having an open first end and a closed second end; disposing the open second end of the first conduit portion proximate to the open first end of the second conduit portion to define a weld region; supplying a gas to the interior volume at a substantially constant rate; welding said first conduit portion to said second conduit portion during said step of supplying said gas to the interior volume at a substantially constant rate, and venting the gas from the interior volume at a rate that maintains the gas in the interior volume within a pressure range suitable to hold a weld bead in the weld region in equilibrium during formation of a weld to join the first conduit portion and the second conduit portion.

30. The method of claim 29, wherein supplying the gas comprises placing the interior volume in fluid communication with a pressurized gas source.

31. The method of claim 29, wherein venting the gas comprises placing the interior volume in fluid communication with a location external to the conduit assembly.

32. The method of claim 29, further comprising measuring at least one of gas flow rate and gas pressure.

33. The device of claim 1, wherein the vent element is disposed in the interior volume and is configured to maintain a valveless flow path of said gas between said interior volume of said conduit assembly to a volume external said conduit assembly.

34. The device according to claim 22, further including a sensor connected to said vent assembly down stream said multi-port assembly and arranged to measure gas flow rate through said vent element to said external environment.

35. The method according to claim 29, wherein said step of supplying said gas at said substantially constant rate has a flow rate in a range of 0.4 to 0.6 standard cubic feet per minute and at a pressure within a range of approximately 2.5 to 3.5 inches water column.

* * * * *